Sept. 25, 1962         A. GRANDJEAN         3,055,113
TRACING DEVICE
Filed July 23, 1959
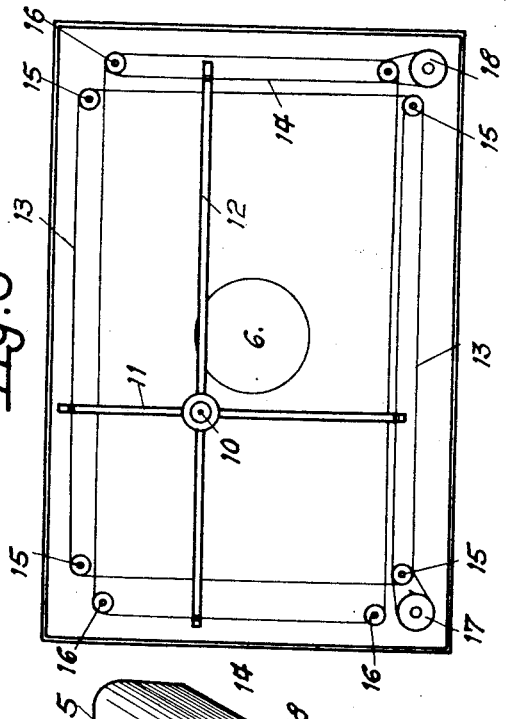

United States Patent Office 3,055,113
Patented Sept. 25, 1962

3,055,113
TRACING DEVICE
Arthur Grandjean, Paris, France, assignor to Paul Chaze, Le Kremlin-Bicetre (Seine), France
Filed July 23, 1959, Ser. No. 829,046
Claims priority, application France May 28, 1959
4 Claims. (Cl. 33—18)

My invention has for its object a tracing device adapted to trace on a transparent surface all the lines, symbols, drawings, letter-press which may be desired and to wipe them out instantaneously.

This arrangement, which is capable of many applications for advertising purposes, for moving pictures, toys, testing means for instance, is constituted chiefly by a fluidtight case provided in its upper part with a translucent surface of glass or the like material which is made opaque when the case is turned upside down, said case being partly filed with a pulverulent metallic or other material adapted to adhere then to said translucent surface and being provided inwardly with a removable tracing stylus which engages frictionally the inner surface of the translucent surface, so as to remove through its passage the pulverulent material adhering thereto and to form lines which are visible from the outside of the case and may be immediately wiped out through a mere turning of the case upside down associated with a shaking of the latter.

Any mechanical or the like means may serve for moving the tracing stylus underneath the translucent surface.

It is possible to admix advantageously with the pulverulent material small balls of glass for instance, which further a uniform adherence between the pulverulent material and the translucent surface.

The accompanying drawing illustrates, by way of example and by no means in a limiting sense, a preferred embodiment of my invention. In said drawing:

FIG. 1 is a perspective view of the arrangement.

FIG. 2 is, on a larger scale, a sectional view partly torn off.

FIG. 3 is a plan view of an arrangement for actuating the tracing stylus.

FIG. 4 is a view of a detail of said arrangement.

My improved device includes a case 1 closed at its lower end by a plate 2 provided with an upstanding flange 3 and closed at its upper end by a glass 4 or the like translucent surface of any suitable material, the whole arrangement being perfectly fluidtight and enclosed inside a box 5.

There is introduced into the case 1 through a port 6 which is covered afterwards by a closing member 7, a predetermined amount of a pulverulent material 8 such as aluminium powder to which may be admixed glass of the like balls 9 and which is capable of adhering to the inner surface of the glass 4, so as to render the latter entirely opaque when the case 1 is turned upside down.

Inside the case 1 is arranged in contact with the glass 4 a movable tracing stylus 10 adapted to assume a movement in any desired direction over the glass. To this end, the tracing stylus 10 may slide along two rods 11 and 12 arranged at right angles with each other and adapted to move in orthogonal directions under the action of the endless cables 13 and 14 to which said rods are connected and which pass over grooved transmisison pulleys 15 and 16 revolving freely round spindles fitted on the bottom plate 2 of the case.

Two knobs 17 and 18 projecting above the upper surface of the box 5 may, when they are angularly shifted by hand in either direction, shift in corresponding directions the cables 13 and 14 and, consequently, the rods 11 and 12, the cables 13 and 14 extending respectively each inside a groove 19 of the knob engaging the cable considered.

When the glass 4 has been rendered opaque through adherence of the metal or the like pulverulent material 8, the knobs 17 and 18 are suitably operated, so that the tracing stylus is shifted in the desired direction and, by frictionally engaging the inner surface of the glass, it removes along its path a narrow strip of the pulverulent material 8. This produces a line 20 (FIG. 1) appearing outside the glass 4 and which may be continued so as to form any drawing, symbol, letter-press or the like which it is desired to show to external view.

It is then sufficient to turn the device upside down and to shake it so that the pulverulent material 8, associated if required with the balls 9 which further its adherence, covers again the lines drawn by the tracing stylus 10 and provides again opacity throughout the surface of the glass 4.

Of course, the case may be executed in any other desired manner and any other inner or outer mechanism may serve for driving the tracing stylus without thereby widening the scope of the invention as defined in the accompanying claims.

What I claim is:

1. An educational game comprising a closed casing having spaced fixed top and bottom surfaces, the said top surface being formed flat and translucent, a powdered material in said casing adapted to move by gravity toward the underside of the said top surface or toward the bottom surface depending upon the relative positions of said surfaces and adapted to adhere slightly to said top surface when dropped against said surface as when said surface is inverted relatively to the bottom surface, whereby to render said top surface opaque, a stylus, a pair of rods at right angles to one another, means mounting said stylus for sliding movement on each of said rods, a pair of supporting and actuating cords for each rod, means mounting each of said supporting and actuating cords for linear movement substantially in a horizontal plane when said translucent surface is horizontal, one of said cords of each pair being fastened to one end of one of said rods and the other cord of each pair being fastened to the other end of said one of said rods and forming the sole means for supporting each of said rods and said stylus for substantial horizontal movement with said cords holding said rod supported stylus yieldingly in scraping contact with the underside of said top surface in all positions of said rods, manual means for moving said cords whereby to move each of said rods for the manipulation of said stylus to scrape said powdered material from said top surface to render it translucent where said powdered material is so removed by the movement of said stylus relatively to the said surface.

2. An educational game comprising a closed casing having vertically spaced fixed top and bottom surfaces, the said top surface being formed flat and translucent, a powdered material in said casing adapted to move by gravity toward the underside of the top surface or toward the bottom surface depending upon the relative positions of said surfaces and adapted to adhere slightly to said top surface when dropped against said surface as when said surface is inverted relatively to the bottom surface, whereby to render said top surface opaque, a stylus, a pair of rods at right angles to one another, means mounting said stylus for sliding movement on each of said rods, a knob at each side of said casing, independent flexible cords fastened to the ends of said rods and forming the sole means for guiding said rods, for actuating said rods, and also for supporting said rods and said stylus mounting means with said stylus held yieldingly by said cords in scraping contact with the underside of said top surface whereby to scrape said powdered material from said top surface to render it translucent where said powdered material is so removed by the movement of said stylus relatively to the said surface, and means rotatable by each of said knobs to move independently said cords whereby to move and guide said rods to move said stylus with said cords supporting said rods to hold said stylus against said top surface.

3. An educational game comprising a closed casing having spaced fixed top and bottom surfaces, the top surface being formed flat and translucent, a powdered material in said casing lying loosely therein on the bottom surface whereby to drop freely from the bottom surface against the underside of the translucent top surface when said casing is inverted, said powdered material moving freely between the top and bottom surfaces upon manual shaking of the closed casing and adhering slightly to said top surface to render it opaque, a stylus, means including cords supporting and mounting said stylus for universal movement in said casing in a plane parallel to said top surface with its point held yieldingly by said cords in scraping contact with said top surface whereby to scrape said powdered material from said top surface to render it translucent where said powdered material is so removed, said powdered material dropping against said bottom surface until said casing is inverted and shaken to effect covering of the portion of the translucent surface from which said powdered material was scraped by said stylus, the quantity of powdered material in said casing being such as to permit free movement of said stylus in said casing by said mounting means and cords while sufficient to cover effectively the translucent surface upon shaking of the casing.

4. An educational game comprising a closed casing having spaced fixed top and bottom surfaces, the said top surface being formed flat and translucent, a powdered material in said casing adapted to move by gravity toward the underside of the said top surface or toward the bottom surface depending upon the relative positions of said surfaces and adapted to adhere slightly to said top surface when dropped against said surface as when said surface is inverted relatively to the bottom surface, whereby to render said top surface opaque, a stylus, a pair of rods at right angles to one another, means mounting said stylus for sliding movement on each of said rods, guiding, supporting and actuating cords, means guiding said cords for linear movement within said casing, said cords being secured relatively to said rods and yieldingly supporting said rods and said stylus within said casing for thereby maintaining said rod mounted stylus yieldingly in scraping contact with the underside of said top surface, means for moving said guiding, supporting and actuating cords to move said rod supported stylus yieldingly relatively to said top surface to scrape said powdered material from said top surface to render it translucent where said powdered material is so removed by the movement of said stylus relatively to the said surface, after which upon inversion of said casing and the shaking thereof said powder covers the portion of said translucent surface from which said powdered material was removed by said stylus.

References Cited in the file of this patent

UNITED STATES PATENTS

| | | |
|---|---|---|
| 1,252,102 | Erdle | Jan. 1, 1918 |
| 1,681,460 | Bruhn | Aug. 21, 1928 |
| 2,322,653 | Mitchel | June 22, 1943 |
| 2,389,359 | Grow | Nov. 20, 1945 |
| 2,566,546 | Barnes et al. | Sept. 4, 1951 |
| 2,588,763 | Reilly et al. | Mar. 11, 1952 |

FOREIGN PATENTS

| | | |
|---|---|---|
| 255,014 | Italy | Oct. 4, 1927 |
| 569,549 | Italy | Nov. 21, 1957 |